United States Patent
Fujita et al.

(10) Patent No.: US 12,415,208 B2
(45) Date of Patent: Sep. 16, 2025

(54) CLEANING TOOL AND CLEANING METHOD

(71) Applicant: FUJIKURA LTD., Tokyo (JP)

(72) Inventors: Shunsuke Fujita, Chiba (JP); Yuya Sakaguchi, Chiba (JP)

(73) Assignee: Fujikura Ltd., Tokyo (JP)

( * ) Notice: Subject to any disclaimer, the term of this patent is extended or adjusted under 35 U.S.C. 154(b) by 27 days.

(21) Appl. No.: 18/255,364

(22) PCT Filed: Sep. 30, 2021

(86) PCT No.: PCT/JP2021/036129
§ 371 (c)(1),
(2) Date: May 31, 2023

(87) PCT Pub. No.: WO2022/208943
PCT Pub. Date: Oct. 6, 2022

(65) Prior Publication Data
US 2024/0091824 A1    Mar. 21, 2024

(30) Foreign Application Priority Data

Mar. 29, 2021   (JP) .................................. 2021-055005

(51) Int. Cl.
  *B08B 1/10*   (2024.01)
  *B08B 1/14*   (2024.01)
  *B08B 7/00*   (2006.01)
  *G02B 6/38*   (2006.01)

(52) U.S. Cl.
  CPC ................ *B08B 1/10* (2024.01); *B08B 1/143* (2024.01); *B08B 7/0028* (2013.01); *G02B 6/3866* (2013.01); *B08B 2240/02* (2013.01)

(58) Field of Classification Search
  CPC . B08B 2240/02; B08B 7/0028; G02B 6/3866; A47L 25/005
  See application file for complete search history.

(56) References Cited

U.S. PATENT DOCUMENTS 10,802,227 B2 * 10/2020 Nakane ..................... B08B 1/30
2011/0297184 A1   12/2011 Mahapatra et al.

FOREIGN PATENT DOCUMENTS

| JP | 2005-181971 A | 7/2005 |
| JP | 2007-297177 A | 11/2007 |
| JP | 2008-105015 A | 5/2008 |
| JP | 2008-272665 A | 11/2008 |
| JP | 2014-081445 A | 5/2014 |
| JP | 6498814 B1 | 4/2019 |
| WO | 2020/059853 A1 | 3/2020 |

OTHER PUBLICATIONS

International Search Report issued in corresponding International Application No. PCT/JP2021/036129, mailed Dec. 21, 2021 (4 pages).

* cited by examiner

*Primary Examiner* — Laura C Guidotti
(74) *Attorney, Agent, or Firm* — Osha Bergman Watanabe & Burton LLP (57) ABSTRACT

A cleaning tool includes: a first tape including an adhesive surface; a head around which the first tape is wrapped and that presses the adhesive surface against an object; a feeder that transports the first tape and a second tape in contact with the adhesive surface; and a separator that separates the first tape from the second tape during transportation of the first tape to the head.

5 Claims, 6 Drawing Sheets

(FIRST EMBODIMENTS)

FIG. 1A (FIRST EMBODIMENTS)

FIG. 1B (COMPARATIVE EXAMPLE)

CLEANING TOOL AND CLEANING METHOD

TECHNICAL FIELD

The present disclosure relates to a cleaning tool and a cleaning method.

The present application claims priority based on Japanese Patent Application No. 2021-055005 filed on Mar. 29, 2021, the contents of which are incorporated herein by reference.

BACKGROUND

It is common practice to clean a connection end face of an optical connector with a cleaning tool. PTL 1 discloses a cleaning tool employing a tape having adhesive force.

PATENT LITERATURE

PTL 1: Japanese Patent Application Laid-open Publication No. 2014-081445

If an adhesive surface of a cleaning body comes into contact with air and thereby the adhesive surface deteriorates, cleaning capability may be impaired.

SUMMARY

The present invention can suppress deterioration of an adhesive surface.

A cleaning tool according to one or more embodiments includes: a first tape including an adhesive surface; a head around which the first tape is wrapped, the head being configured to press the adhesive surface against an object; a transportation part configured to transport the first tape and a second tape in contact with the adhesive surface; and a separation part configured to separate the first tape and the second tape during transportation of the first tape to the head.

A cleaning method according to one or more embodiments includes: transporting, toward a head, a first tape including an adhesive surface and a second tape in contact with the adhesive surface; separating the first tape and the second tape during transportation of the first tape to the head; and pressing the adhesive surface of the first tape wrapped around the head against an object.

Other features of the invention will become apparent from the following description of the present Specification and Drawings.

According to the present invention, it is possible to suppress deterioration of an adhesive surface.

DETAILED DESCRIPTION

Embodiments as examples of the present invention are described according to the following description of the Specification and Drawings.

First Embodiments

{Basic Configuration}

Figure 1A:
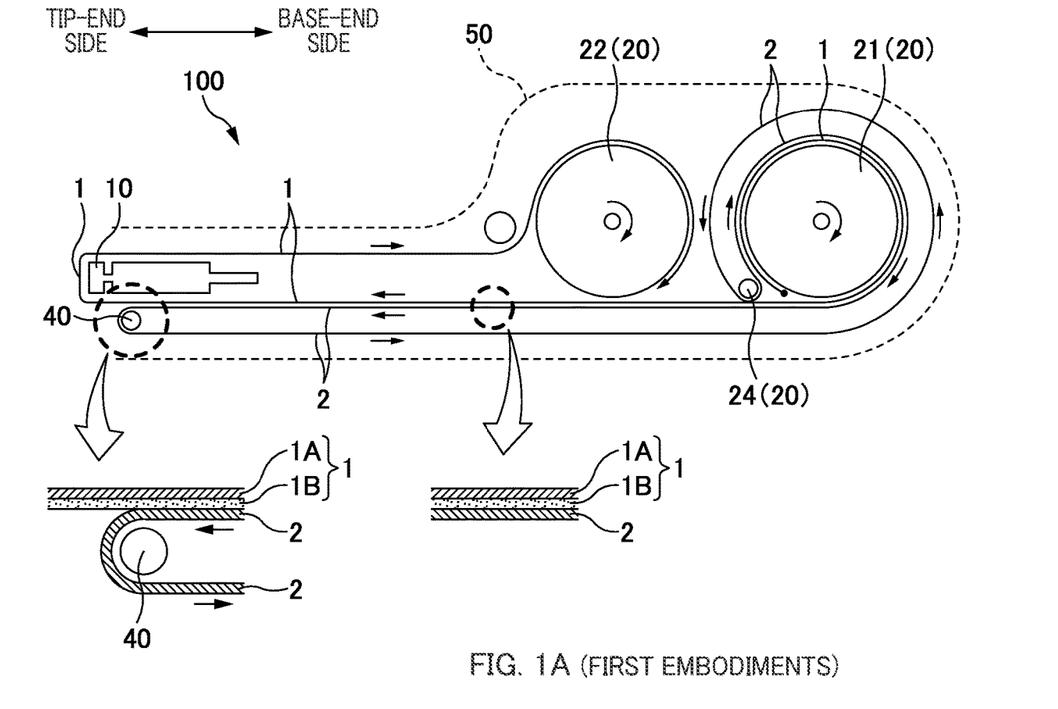
FIG. 1A is an explanatory diagram of a cleaning tool 100 of first embodiments.

FIG. 1A is an explanatory diagram of a cleaning tool 100 of first embodiments.

A cleaning tool 100 is a tool that is used for cleaning an optical connector (object to be cleaned). The cleaning tool 100 includes a head 10 and a transportation part (i.e., feeder) 20. The cleaning tool 100 also includes a housing 50 configured to house the transportation part 20 etc. In the figure, the dotted line illustrates the housing 50.

The head 10 is a member for pressing a cleaning tape (first tape 1) against an object to be cleaned. In one or more embodiments, the cleaning tape includes an adhesive surface. In the following description, the cleaning tape including an adhesive surface may be referred to as a "first tape". The first tape may be referred to as an adhesive tape. The side on which the first tape 1 is pressed against an object to be cleaned is referred to as the tip-end side, whereas the direction opposite therefrom is referred to as the base-end side. The first tape 1 is wrapped around the tip-end side of the head 10. In the following description, the direction in which the first tape 1 is transported may be referred to as "transporting direction", and in the transporting direction, the supplying side may be referred to as "upstream side", whereas the opposite side therefrom may be referred to as "downstream side".

FIGS. 2A to 2D are explanatory diagrams illustrating how cleaning is conducted. Herein, the object to be cleaned is a lens surface of a lensed ferrule 91 of an optical connector 90. Note, however, that the object to be cleaned is not limited to a lens surface.

Figure 2A:
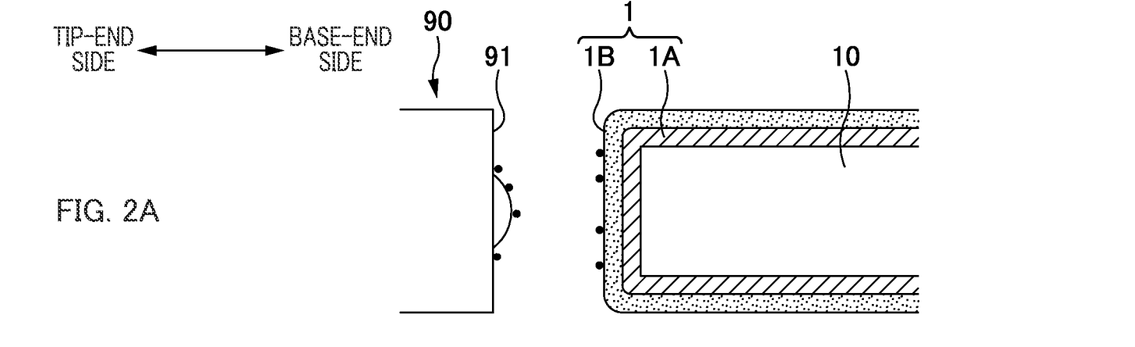
FIGS. 2A to 2D are explanatory diagrams illustrating how cleaning is conducted.
Figure 2B:
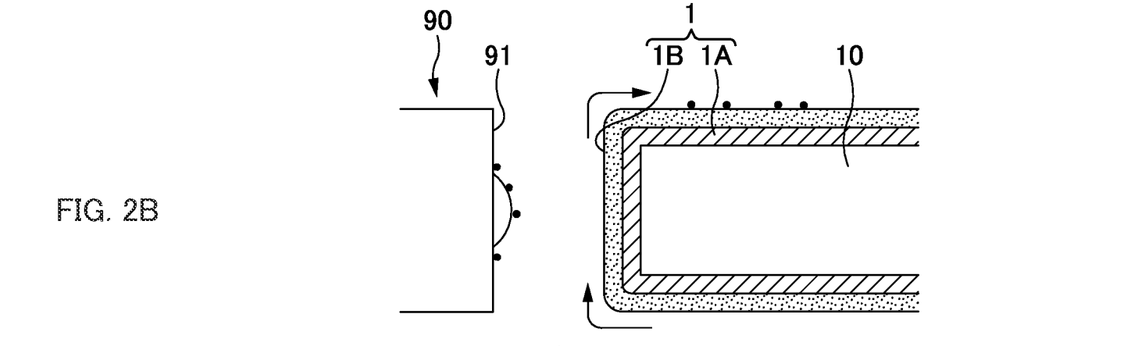
Figure 2C:
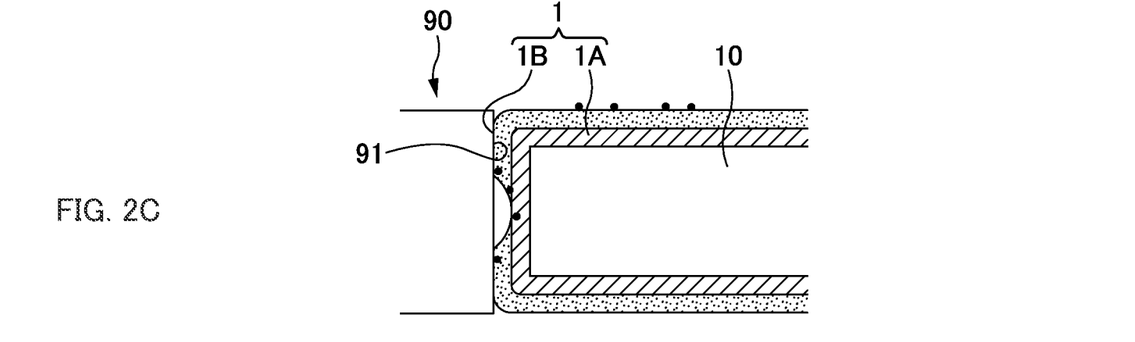
Figure 2D:
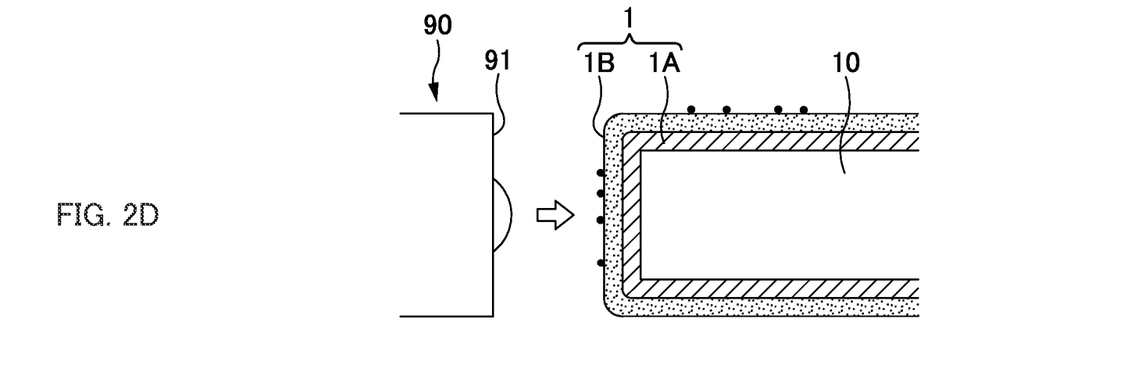

As illustrated in FIG. 2A, the first tape 1 is wrapped around a pressing surface (head surface) of the head 10 in a manner that the adhesive surface faces outward. As illustrated in FIG. 2B, by transporting the first tape 1, an unused portion of the first tape 1 (unused adhesive surface) is supplied to the pressing surface of the head 10. After an unused portion of the first tape 1 has been supplied to the pressing surface of the head 10, the head 10 is brought close to the object to be cleaned, and thereby the first tape 1 is pressed against the object to be cleaned (herein, the lens surface) by the pressing surface of the head 10, as illustrated in FIG. 2C. After the first tape 1 has been pressed against the object to be cleaned, the head 10 is separated from the object to be cleaned, and thereby the first tape 1 is pulled off from the object to be cleaned. Since the first tape 1 has an adhesive surface, foreign matter on the surface of the object to be cleaned will adhere to the first tape 1 (i.e., the object to be cleaned will be cleaned). The portion of the first tape 1 that has contacted the object to be cleaned becomes a used portion of the first tape 1. Immediately after the first tape 1 is peeled off from the object to be cleaned, the used portion of the first tape 1 is located on the pressing surface of the head 10. Note, however, that by transporting the first tape 1 as illustrated in FIG. 2B, an unused portion of the first tape 1 will be supplied to the pressing surface of the head 10. In the following description, a portion of the first tape 1 before passing the pressing surface of the head 10 may be referred to as an "unused portion of the first tape". On the other hand, a portion of the first tape 1 after passing the pressing surface of the head 10 may be referred to as a "used portion of the first tape".

For example, the first tape 1 includes a base member 1A and an adhesive layer 1B (sticky layer). The adhesive layer 1B is disposed on one surface of the base member 1A, and the surface of the adhesive layer 1B (the surface on the opposite side from the base member 1A) constitutes the adhesive surface. The adhesive layer 1B is self-adhesive. Herein, "self-adhesive" means that the adhesive strength between the adhesive surface and another member (herein, the lens surface) is weaker than the breaking strength of the first tape 1, and the adhesive layer 1B does not transfer onto the counterpart member when the adhesive surface is pulled off from the other member.

The transportation part 20 is a mechanism for transporting the first tape 1. The transportation part 20 is located on the base-end side relative to the head 10. The transportation part 20 has a function of supplying the first tape 1 to the head 10, and a function of recovering the first tape that has been supplied to the head 10. For example, the transportation part 20 includes a first reel 21 (supply reel) and a second reel 22 (recovery reel; take-up reel). The first reel 21 is a member (reel or bobbin) around which an unused portion of the first tape 1 is wound. The second reel 22 is a member (reel or bobbin) with which a used portion of the first tape 1 is recovered. The transportation part 20 supplies an unused portion of the first tape 1 from the first reel 21 to the head 10, and winds and recovers a used portion of the first tape 1 onto the second reel 22. A transportation path from the first reel 21 of the transportation part 20 to the head 10 may be referred to as a "supply path". On the other hand, the transportation path from the head 10 to the second reel 22 of the transportation part 20 may be referred to as a "recovery path".

Figure 3A:
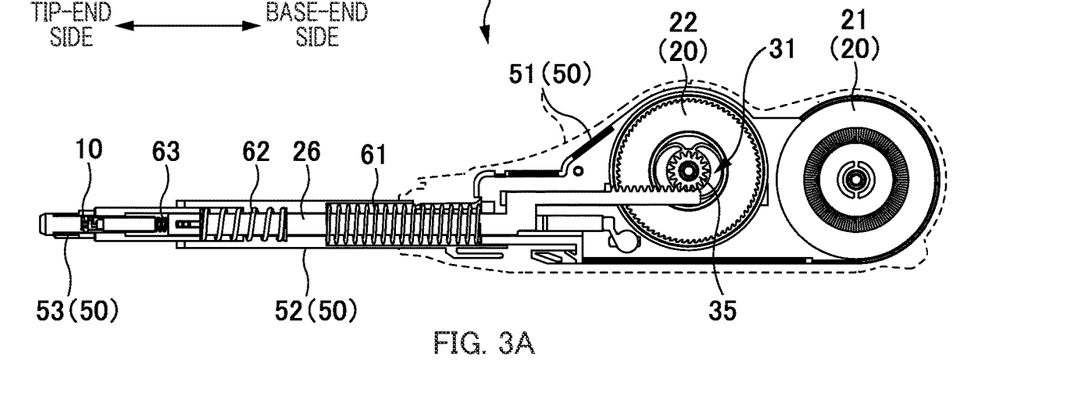
FIGS. 3A to 3C are explanatory diagrams illustrating states of the interior of a housing 50 during pushing operation.
Figure 3B:
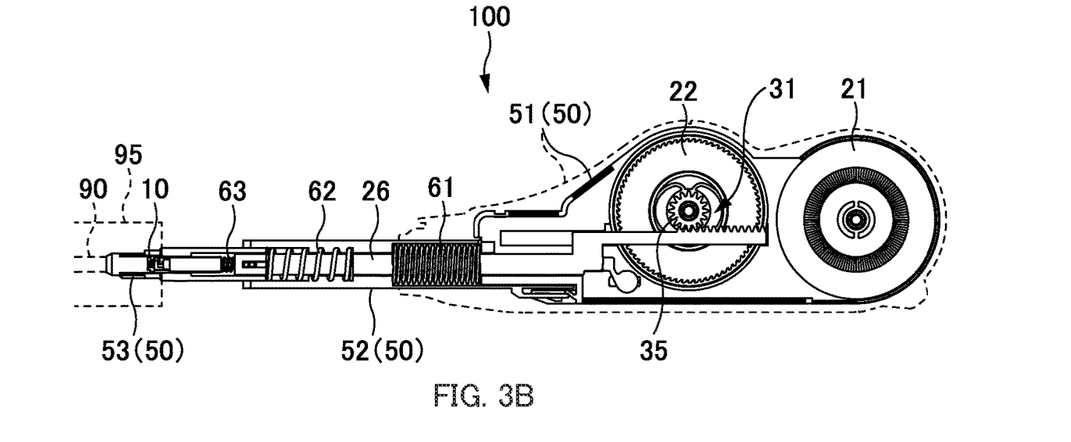
Figure 3C:
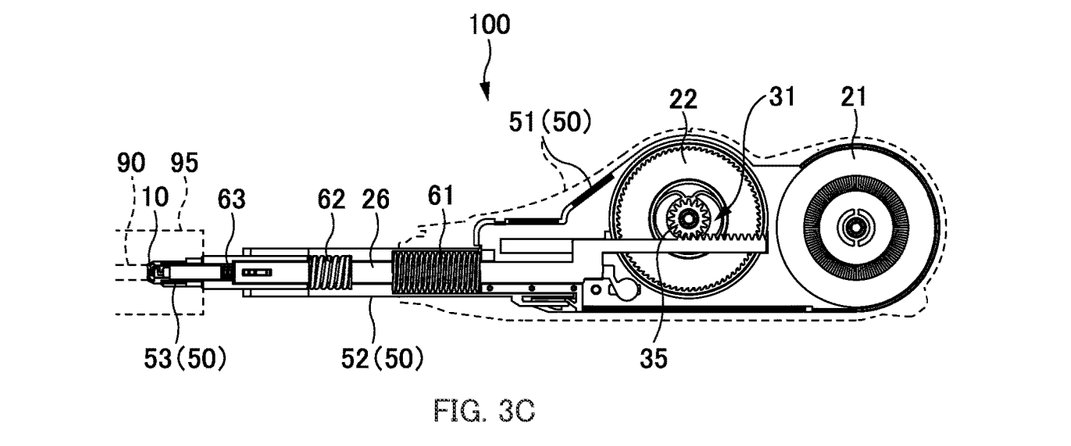

FIGS. 3A to 3C are explanatory diagrams illustrating an example of the transportation part 20.

The transportation part 20 includes a rack-and-pinion mechanism 31. The rack-and-pinion mechanism 31 converts linear relative motion between a first housing 51 and a second housing 52 into rotary motion and thereby causes a transmission wheel 35 to rotate. When the transmission wheel 35 rotates in the forward direction, the second reel 22 rotates in a take-up direction, and the first tape 1 is recovered by the second reel 22. The second reel 22 is restricted such that it rotates only in one direction (take-up direction). Therefore, when the transmission wheel 35 rotates in the opposite direction, the second reel 22 does not rotate and the transmission wheel 35 idles. An amount of first tape 1 worth the distance of the first tape 1 recovered by the second reel 22 is supplied from the first reel 21, and thereby the first tape 1 is transported toward the head 10 (see FIG. 2B). As described above, the transportation part 20 is configured to transport the first tape 1 (and the second tape 2) by employing the relative movement between the first housing 51 and the second housing 52 during cleaning. It should be noted that the transportation part 20 is not limited to the configuration illustrated in FIGS. 3A to 3C. For example, the transportation part 20 may be configured such that an operator rotates the second reel 22 with his/her fingers to transport the first tape 1.

Incidentally, if the first tape 1 is supplied to the head 10 in a state where the adhesive surface of the first tape 1 is being pressed against an object to be cleaned, a portion of the adhesive layer 1B may be broken off and adhesive scrap pieces may be produced. To address this, in one or more embodiments, a third housing 53 inhibits contact between the first tape 1 and an object to be cleaned, to thereby suppress the adhesive surface and the object to be cleaned from rubbing against one another.

As illustrated in FIG. 3A, the third housing 53 is located on the tip-end side of the second housing 52 and houses the head 10. Further, as illustrated in FIG. 3A, a first spring 61 is located between the first housing 51 and the second housing 52, and a second spring 62 is located between the second housing 52 and the third housing 53. The first spring 61 is configured so as to be more deformable than the second spring 62. As illustrated in FIG. 3B, at the time of cleaning, when the third housing 53 is made to abut against an edge of an optical adapter 95, the first spring 61 deforms greatly before the second spring 62 does (and the first housing 51 and the second housing 52 move relative to one another). Next, as illustrated in FIG. 3C, the second spring 62 deforms, and thereby the head 10 is exposed from the third housing 53 (and the first tape 1 wrapped around the head 10 can contact an object to be cleaned). In this way, while the first tape 1 is being supplied to the head 10 (i.e., when the first housing 51 and the second housing 52 are moving relative to one another), the third housing 53 inhibits the first tape 1 from contacting the object to be cleaned.

Figure 1B:
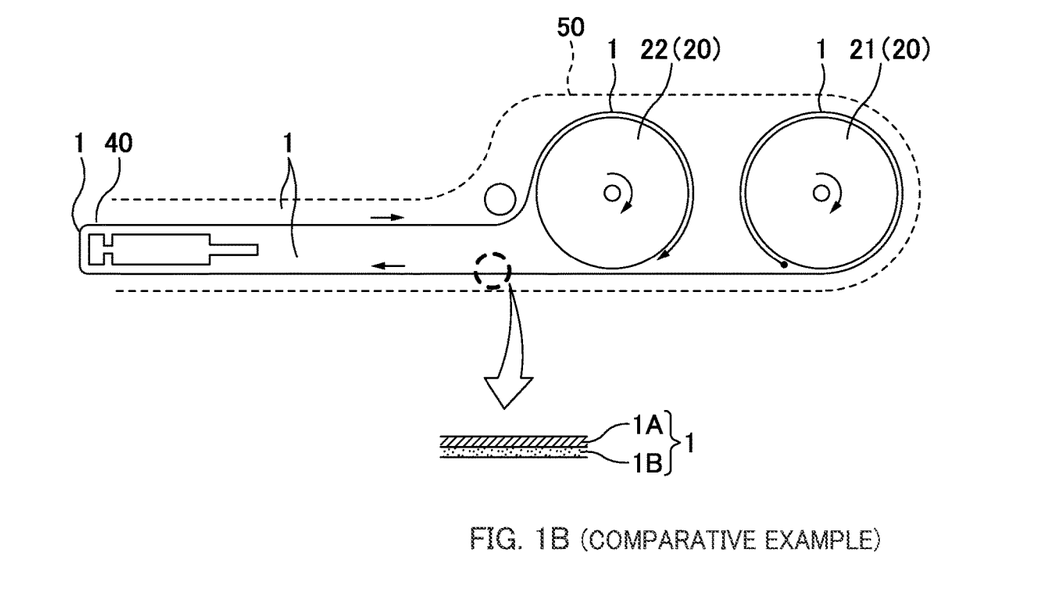
FIG. 1B is an explanatory diagram of a cleaning tool 100 of a comparative example.

FIG. 1B is an explanatory diagram of a cleaning tool 100 of a comparative example. In the comparative example, the adhesive surface of the first tape 1 is exposed while an unused portion of the first tape 1 is supplied from the first reel 21 to the head 10 on the supply path. As in this case, if the adhesive surface is in contact with air for a long time, the adhesive surface may deteriorate, and as a result, cleaning capability may deteriorate. Particularly, in cases where sliding members are present inside the housing 50 (illustrated by the dotted line in FIG. 1B), dust (wear debris) occurring from the sliding members will be present inside the housing 50. Hence, according to the configuration of the comparative example, the adhesive surface may deteriorate due to dust adhering to the unused portion of the adhesive surface of the first tape 1 in the supply path. In contrast, in one or more embodiments, the adhesive surface of the first tape 1 is protected in the supply path. This feature is described below.

The transportation part 20 of one or more embodiments transports a second tape 2 together with the first tape 1 at least in the supply path (see FIG. 1A). The second tape 2 is a tape for protecting the adhesive surface of the first tape 1 by being in contact with the adhesive surface of the first tape 1. The second tape 2 in contact with the adhesive surface of the first tape 1 is peelable from the first tape 1. The second tape 2 may be referred to as a protection tape or a peeling tape. The second tape 2 can protect the adhesive surface of the first tape 1 and thereby suppress deterioration of the adhesive surface. In order to protect the first tape 1, which is transported toward the head 10 on the supply path, until immediately before it is used for cleaning an object to be cleaned, the second tape 2 is in contact with the adhesive surface of the first tape 1 more on the upstream side, in the transporting direction, than the head 10. In this way, the transportation part 20 can transport, toward the head 10, the first tape 1 as well as the second tape 2 in contact with the adhesive surface of the first tape 1.

As illustrated in FIG. 1A, the cleaning tool 100 of one or more embodiments includes a separation part (i.e., separator) 40. The separation part 40 is a member for separating the first tape 1 and the second tape 2 during transportation of the first tape 1 to the head 10. As a result of the separation part 40 separating the first tape 1 and the second tape 2, the first tape 1 can be wrapped around the pressing surface of the head 10 in a manner that the adhesive surface of the first tape 1 on the supply path faces outward. Herein, the separation part 40 is constituted by a roller disposed on the upstream side of the head 10. The second tape 2 is wrapped around the outer circumferential surface of the roller constituting the separation part 40; the transporting direction of the second tape 2 is changed and turned back at the separation part 40, and thereby, the second tape 2 is separated (peeled) from the adhesive surface of the first tape 1. It should be noted that the separation part 40 is not limited to a roller, so long as it can separate the first tape 1 and the second tape 2. For example, the separation part 40 may be a plate-shaped member.

In the first embodiments, the second tape 2 is configured in a loop. That is, in the first embodiments, the second tape 2 is constituted by an endless tape. In the first embodiments, the transportation part 20 includes a roller 24 (direction-changing roller) for circulating the second tape 2 between it and the separation part 40. By circulating the second tape 2, the second tape 2 having separated from the first tape 1 comes into contact with the first tape 1 again.

Figure 4:
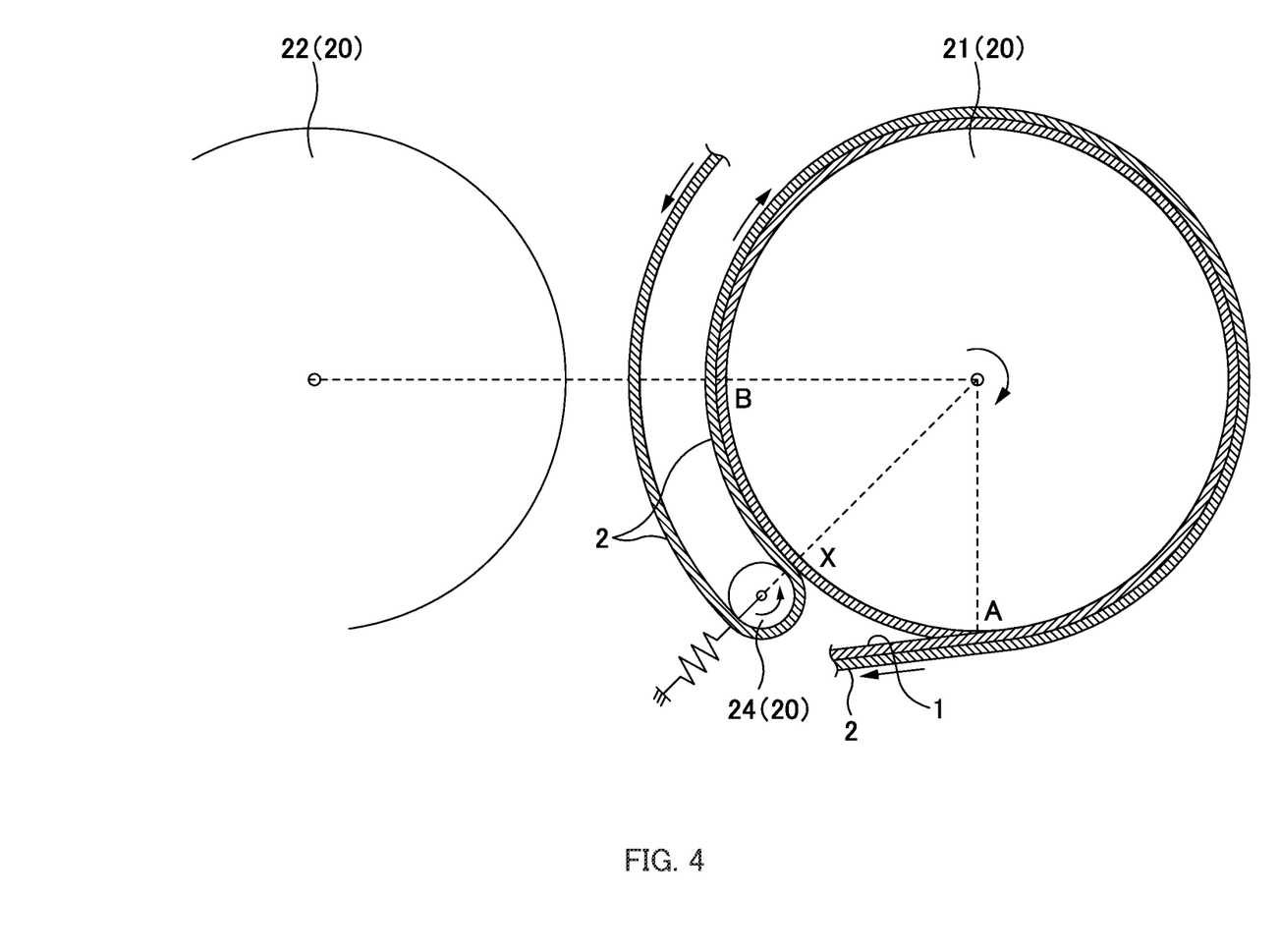
FIG. 4 is an explanatory diagram of the periphery of a roller 24.

FIG. 4 is an explanatory diagram of the periphery of the roller 24. As described above, the first tape 1 is wound around the first reel 21, but the figure illustrates the first tape 1 in the outermost layer (outermost lap) on the first reel 21. It should be noted that, in FIG. 4 (and FIG. 1A), the outer track and the inner track of the second tape 2 are schematically illustrated as being separated from one another, for the sake of facilitating explanation. Actually, however, the second tape 2 is in a state where tension is applied thereto, and hence, the inner track and the outer track of the second tape 2 are in contact with one another except in the vicinity of the roller 24 (and the separation part 40).

As illustrated in FIG. 4, the second tape 2 supplied from the roller 24 comes into contact with the adhesive surface of the first tape 1 in an outermost layer thereof wound around the first reel 21. In this way, the adhesive surface of the first tape 1 is protected by the second tape 2 from the stage where it is wound around the first reel 21. Therefore, the period during which the adhesive surface of the first tape 1 is in contact with air can be shortened, and thus deterioration of the adhesive surface can be suppressed.

Position A in FIG. 4 is the position where the first tape 1 in the outermost layer on the first reel 21 is peeled from the first tape 1 in an underlying layer. The position A is the position where the adhesive surface of the first tape 1 starts to contact air. Position B in FIG. 4 is the position where a line connecting the rotation axis of the first reel 21 and the rotation axis of the second reel 22 intersects with the first tape 1 in the outermost layer on the first reel 21. The position B is the position where the distance between the first reel 21 and the second reel 22 becomes the shortest. Position X in FIG. 4 is the position where the second tape 2 comes into contact with the first tape 1. In one or more embodiments, the position X is between the position A and the position B. In this way, the roller 24 can be disposed within a relatively wide space, while shortening the period during which the adhesive surface of the first tape 1 is in contact with air.

Figure 5A:
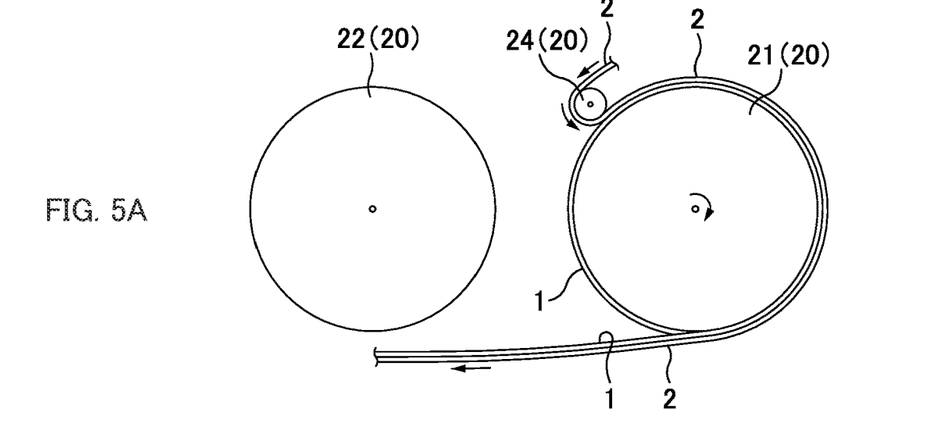
FIGS. 5A to 5C are explanatory diagrams of modified examples of locations of the roller 24.
Figure 5B:
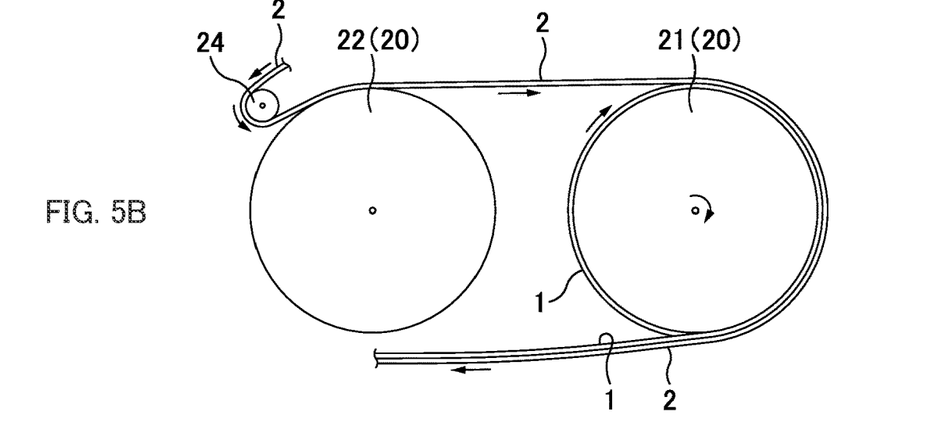
Figure 5C:
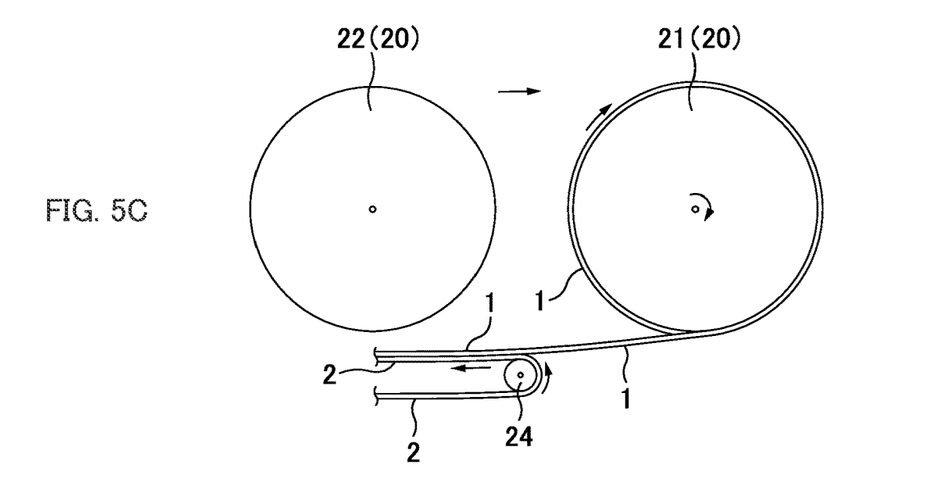

FIGS. 5A to 5C are explanatory diagrams of modified examples of locations of the roller 24.

Also in the modified examples illustrated in FIGS. 5A and 5B, the second tape 2 supplied from the roller 24 comes into contact with the adhesive surface of the first tape 1 in an outermost layer thereof wound around the first reel 21, similar to the first embodiments illustrated in FIG. 4. In this way, the adhesive surface of the first tape 1 can be protected by the second tape 2 from the stage where it is wound around the first reel 21. It should be noted that, as illustrated in FIG. 5C, the second tape 2 may be brought into contact with the first tape 1 after it is supplied from the first reel 21. However, in the case of FIG. 5C, the period, during which the adhesive surface of the first tape 1 in an outermost layer on the first reel 21 is in contact with air, is long. In contrast, by making the second tape 2 contact the adhesive surface of the first tape 1 in an outermost layer thereof wound around the first reel 21 (i.e., by protecting the first tape 1 with the second tape 2 from the stage where it is wound around the first reel 21) as illustrated in FIGS. 4, 5A and 5B, the period during which the adhesive surface of the first tape 1 is in contact with air can be shortened, and thus deterioration of the adhesive surface can be suppressed.

In the modified example illustrated in FIG. 5A, the roller 24 is located in the outer periphery of the first reel 21, similar to the first embodiments illustrated in FIG. 4. In this way, the second tape 2 moving toward the roller 24 from the separation part 40 and the second tape 2 moving toward the separation part 40 from the roller 24 are both transported along the outer circumferential surface of the first reel 21 (the outer circumferential surface of the first tape 1 wound around the first reel 21). It should be noted that, as in the configuration illustrated in FIG. 5B, the roller 24 may be located at a distance from the outer circumferential surface of the first reel 21. However, in the case of FIG. 5B, extra space becomes necessary for the transportation path of the second tape 2. In contrast, by disposing the roller 24 in the outer periphery of the first reel 21 as illustrated in FIGS. 4 and 5A, the transportation path of the second tape 2 can easily be housed in a limited space.

The modified example illustrated in FIG. 5A is different from the first embodiments illustrated in FIG. 4 in that the position X (i.e., the position where the second tape 2 comes into contact with the first tape 1) is not between the position A (i.e., the position where the first tape 1 in the outermost layer on the first reel 21 is peeled from an underlying layer) and the position B (i.e., the position where the distance between the first reel 21 and the second reel 22 becomes the shortest). Similar to the first embodiments illustrated in FIG. 4, in the modified example illustrated in FIG. 5A, the roller 24 can be disposed within a relatively wide space between the first reel 21 and the second reel 22. However, when the position X is between the position A and the position B as illustrated in FIG. 4, the period during which the adhesive surface of the first tape 1 is in contact with air can be made shorter compared to the modified examples illustrated in FIGS. 5A to 5C.

Second Embodiments

The second tape 2 in the foregoing embodiments is configured in a loop. Note, however, that the second tape 2 is not limited to a loop-shaped tape.

Figure 6:
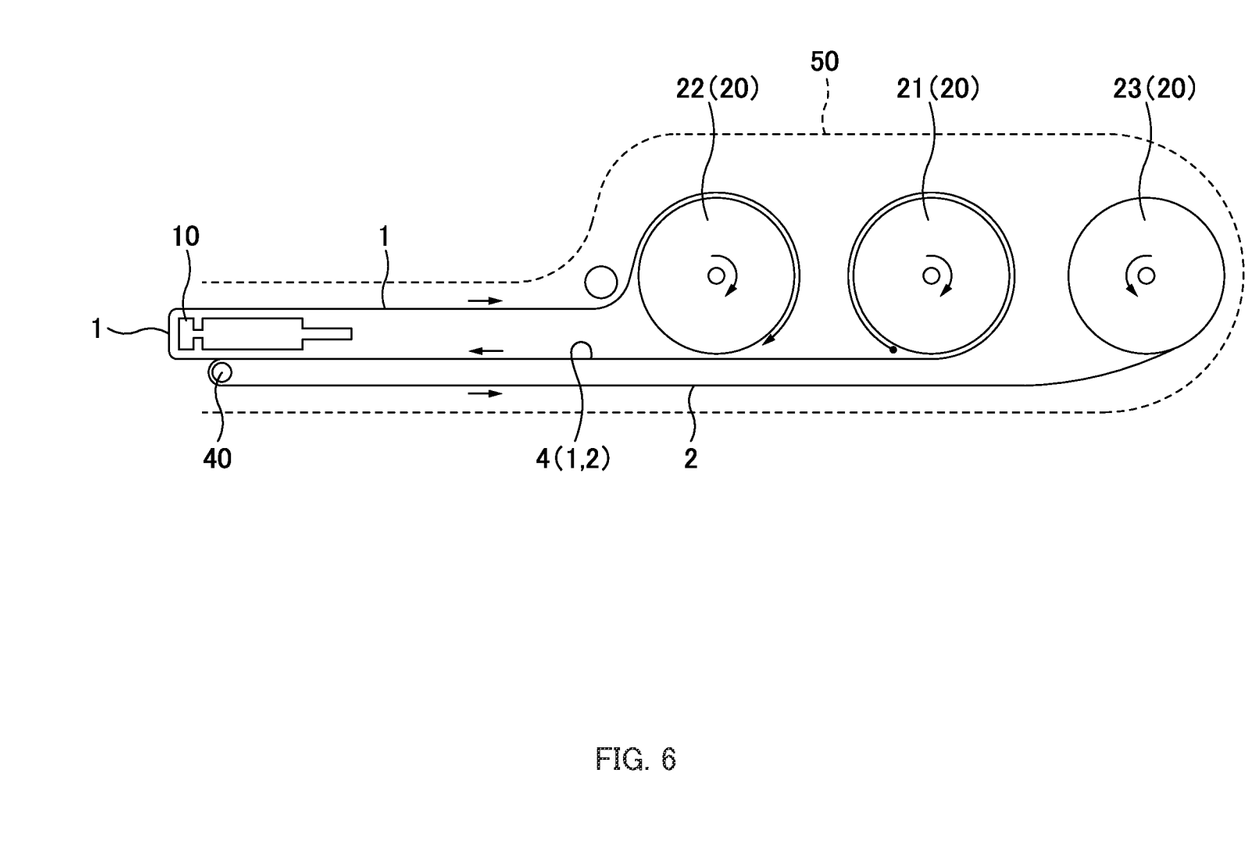
FIG. 6 is an explanatory diagram of a cleaning tool 100 of second embodiments.

FIG. 6 is an explanatory diagram of a cleaning tool 100 of second embodiments.

Similar to the first embodiments, the cleaning tool 100 of the second embodiments includes a head 10, a transportation part 20, and a separation part 40. The cleaning tool 100 also includes a housing 50 for housing the transportation part 20 and the separation part 40. It should be noted that the transportation part 20 may transport the first tape 1 (and the second tape 2) by utilizing the operation of pressing the head 10 against an object to be cleaned during cleaning as in the first embodiments, or may transport the first tape 1 (and the second tape 2) by rotating the second reel 22 manually, or may have other configurations.

In the second embodiments, a composite tape 4 is wound around the first reel 21. The composite tape 4 is a tape in which the second tape 2 is attached to the adhesive surface of the first tape 1. In the second embodiments, the second tape 2 is wound around the first reel 21 together with the first tape 1 in a state where the second tape is in contact with the adhesive surface of the first tape 1 in advance. In the second embodiments, there is a need to prepare a composite tape 4 in which the second tape 2 is attached to the adhesive surface of the first tape 1. On the other hand, the second embodiments are advantageous in that there is no need for a step of bringing the first tape 1 and the second tape 2 into contact with one another during transportation of the first tape 1, as in the first embodiments.

Also in the second embodiments, the first tape 1 and the second tape 2 are separated by the separation part 40 during transportation of the first tape 1 (the composite tape 4) from the first reel 21 to the head 10. In this way, also in the second embodiments, the adhesive surface of the first tape 1 can be protected, and deterioration of the adhesive surface can be suppressed.

The transportation part 20 of the second embodiments includes a third reel 23, in addition to the first reel 21 and the second reel 22. The third reel 23 is a member (reel or bobbin) for recovering the second tape 2 separated by the separation part 40. A gear (not illustrated) is disposed between the third reel 23 and the first reel 21, and the third reel 23 rotates in synchronization with rotation of the first reel 21. In this way, an amount of second tape 2 worth the distance of the second tape 2 (the composite tape 4) supplied by the first reel 21 can be recovered by the third reel 23.

Other Embodiments

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: First tape;
1A: Base member;
1B: Adhesive layer;
2: Second tape;
4: Composite tape;
10: Head;
20: Transportation part;
21: First reel;
22: Second reel;
23: Third reel;
24: Roller;
31: Rack-and-pinion mechanism;
35: Transmission wheel;
40: Separation part;
50: Housing;
51: First housing;
52: Second housing;
53: Third housing;
61: First spring;
62: Second spring;
90: Optical connector;
91: Lensed ferrule;
95: Optical adapter;
100: Cleaning tool.

The invention claimed is:

1. A cleaning tool comprising:
a first tape comprising an adhesive surface;
a head around which the first tape is wrapped and that presses the adhesive surface against an object;
a second tape in contact with the adhesive surface;
a feeder that transports the first tape and the second tape; and
a separator that separates the first tape from the second tape during transportation of the first tape to the head, wherein
the second tape is in a loop,
the feeder comprises a roller, and
the second tape is circulated between the roller and the separator.

2. The cleaning tool according to claim 1, wherein
the feeder further comprises a first reel around which the first tape is wound, and
the second tape supplied from the roller comes into contact with the adhesive surface that is in an outermost layer of the first tape wound around the first reel.

3. The cleaning tool according to claim 2, wherein the roller is disposed in an outer periphery of the first reel.

4. The cleaning tool according to claim 3, wherein
the feeder further comprises a second reel that recovers the first tape, and
a position where the second tape supplied from the roller comes into contact with the first tape is between:
a position where the first tape in the outermost layer on the first reel is peeled from an underlying layer, and
a position of the first tape that is on a line between a center of the first reel and a center of the second reel when viewed parallel to a rotation axis of the first reel.

5. A cleaning method using the cleaning tool according to claim 1, the method comprising:
transporting, with the feeder, the first tape and the second tape toward the head;
separating, with the separator, the first tape from the second tape during transportation of the first tape to the head;
circulating the second tape between the roller and the separator; and
pressing the adhesive surface of the first tape wrapped around the head against the object.

* * * * *